Patented Dec. 1, 1953

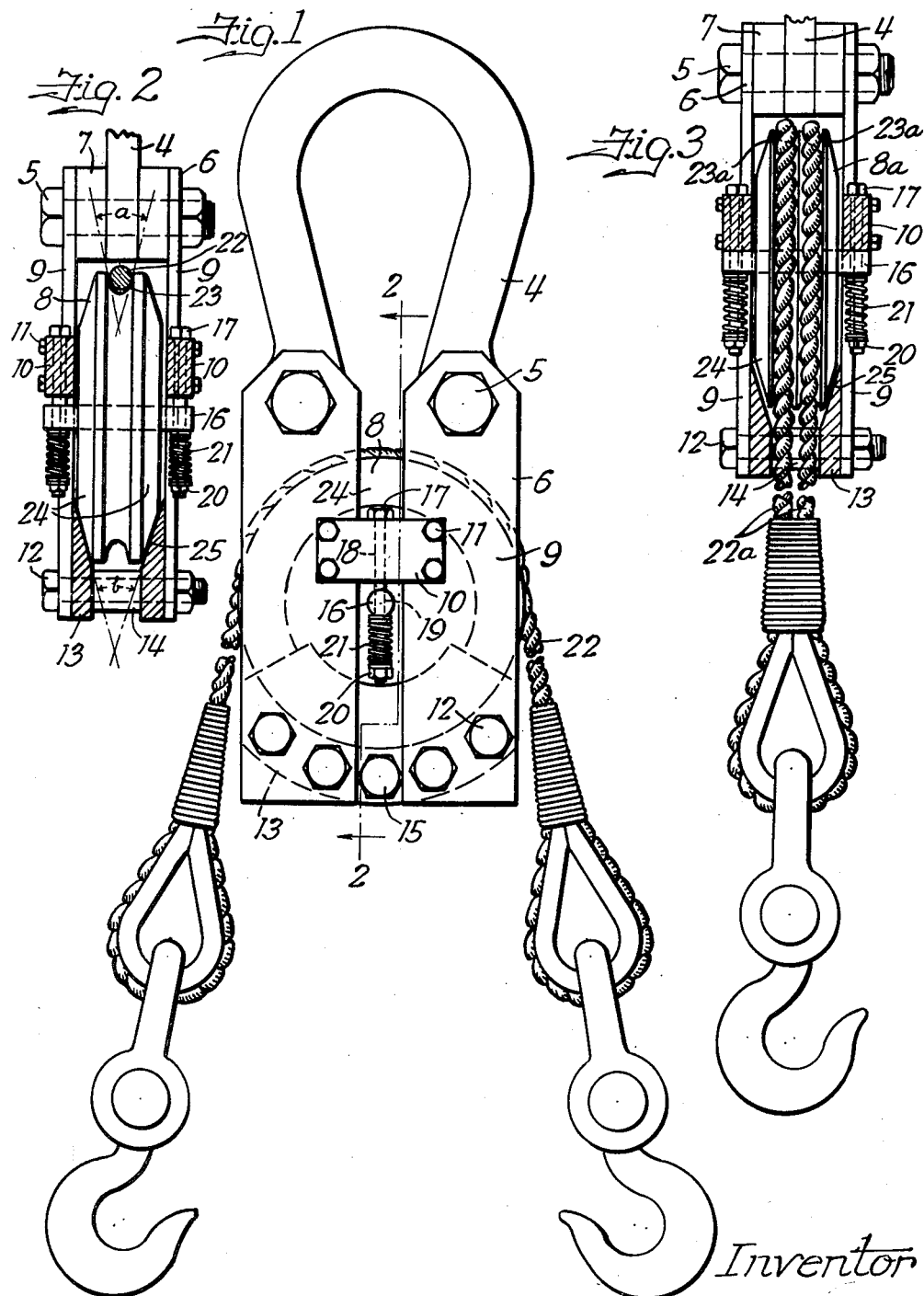

2,661,231

UNITED STATES PATENT OFFICE 2,661,231

SLING

Leslie M. Caldwell, Rockford, Ill.

Application August 25, 1948, Serial No. 46,005

4 Claims. (Cl. 294—1)

This invention relates to slings for use with hoisting equipment generally, and is more particularly concerned with improvements in the self-equalizing and automatically locking type of sling disclosed in my Patent 2,356,147, issued August 22, 1944.

In the sling disclosed in the patent, the pulley wheel is normally free to turn for equalization of the sling but is yieldably mounted so as to yield under load and assume a locked position, so that the cable which has previously adjusted itself cannot shift its position any further and will accordingly hoist the load without danger of tipping. In the construction of that patent I disclosed brake shoe means disposed in the median plane of the pulley wheel and arranged for wedging braking engagement between the flanges thereof. However, that arrangement was objectionable from the standpoint of placing excessive tensile strains upon the flanges, apt to cause breakage, and also from the standpoint of interference of the brake shoes with the cable in the cable type slings to such an extent that I considered it advisable to use the brake shoes to grip the cable for a braking action, this location of the brake shoes being also objectionable in the chain type slings by imposing limitations upon the design of the chain receiving groove in the pulley. It is, therefore, one important object of my present invention to provide a pulley wheel having the outer marginal portion tapered for frictional engagement between opposed wedge-shaped brake shoes to resist turning of the wheel so long as the same continues to be under load, without interfering with the cable in the manner stated, or giving rise to any danger of breakage of any portion of the rim of the wheel by reason of excessive strain, the present arrangement resulting only in non-destructive compression loading of the rim of the wheel and the tensile loading only of through-bolts which fasten together the opposed side plates of the sling frame, the bolts so loaded being capable of withstanding many times the loads imposed without any danger whatsoever of breakage.

Another important object of my present invention is to provide V-grooves to receive the wire cable with a wedging fit to resist slippage, thereby getting the best possible advantage of the automatic frictional locking action of the pulley wheel under load, the groove's included angle for wedging of the cable being preferably slightly smaller than the included angle between the brake shoes for wedging of the pulley wheel so that the pulley wheel will slip before the cable slips in the event some equalization is still absolutely necessary after the initial seating of the pulley wheel, and accordingly, saving the cable from possibly excessive wear by slippage under heavy load, or even breakage under very unusual or extreme conditions. The V-groove feature is applicable to pulleys with a single groove or a multiplicity of grooves, it being a further feature of my invention to employ two, three, or even four passes of cable in as many grooves for proportionately multiplied carrying load, each pass of the cable having, of course, the same wedging engagement in its associated V-groove for non-slipping operation.

The invention is illustrated in the accompanying drawing, in which

Fig. 1 is a side view of a sling made in accordance with my invention, intermediate portions of both end portions of the single pass of cable being broken away to save space and permit showing the device on a larger scale;

Fig. 2 is a vertical section on broken line 2—2 of Fig. 1, with the upper portion of the eye broken away, and indicating the pulley wheel in locked position and also illustrating by a showing of the cable in cross-section how it wedges in the V-groove in the pulley, and Fig. 3 is a similar section of another sling in which the pulley wheel, which in this instance is shown in released position, has two annular V-grooves identical with the annular V-groove in the pulley wheel of Fig. 2, there being shown in this case a single length cable making two passes over the top of the pulley wheel in the two grooves thereof and fitted with thimbles on the two looped ends on opposite sides of the pulley wheel for attachment to load carrying hooks.

Similar reference numerals are applied to corresponding parts in these three views.

Referring to Figs. 1 and 2, the eye 4 that is adapted to receive the crane hook is attached at its ends by bolts 5 to the frame 6 of the sling, spacer washers 7 being assembled on the bolts between the frame side plates to space their upper ends properly to provide operating clearance therebetween for the pulley wheel 8. Each of the frame side plates is made up of two elongated strips 9 connected by a cross-piece or name-plate 10 fastened at its ends to the two strips by screws 11. Bolts 12 fasten the lower ends of the strips 9 together and they pass through registering holes in arcuate brake shoes 13 and spacer sleeves or collars 14 to clamp the shoes and collars in place therebetween. The shoes are also fastened together by another bolt 15 passed through another spacer sleeve or collar 14. The wheel 8 turns on an axle 16 which extends between the strips 9 and is guided for limited up and down movement on bolts 17 that are mounted in vertical holes 18 in the cross-pieces 10 and extend through diametrical holes 19 in the ends of the axle. These bolts support on nuts 20 threaded on their lower ends coiled compression springs 21 on which the ends of the axle 16 rest for yielding support of the pulley wheel 8. In that way, the wheel is normally free to turn for equalization of the load hoisting sling cable 22 but yields under load to assume a frictionally locked wedged position between the shoes 13 in the frame 6, so that the cable 22 which has previously adjusted itself cannot shift its position any further and will accordingly hoist the load without danger of tipping, in accordance with the disclosures of my earlier patent and my copending application, Serial No. 582,304, filed March 12, 1945, that resulted in Patent 2,463,240, issued March 1, 1949.

In accordance with my present invention, the annular groove 23 in the wheel 8 in which the wire cable 22 is disposed is V-shaped to provide a wedging or pinching action under load on the cable to resist slippage of the cable, it being clear that it would be to no purpose ultimately to have the wheel frictionally locked for safe non-tipping hoisting of a load if the cable was thereafter free to slip relative to the locked wheel. The included angle (a) of the V-groove 23 is somewhat smaller than the included angle (b) between the outwardly converging friction brake surfaces 24 on the rim portion of the wheel adapted to fit tightly and wedgingly between the upwardly diverging surfaces 25 on the shoes 13 when the wheel 8 is placed under load compressing the springs 21, whereby to insure that if some slip should occur the wheel 8 will slip before the cable 22 slips and thereby save the cable from possibly excessive wear by slippage under heavy load, or even breakage under very unusual or extreme conditions. The surfaces 24 are widened radially of the wheel and are arranged to have full width engagement with the upwardly diverging surfaces 25 on the brake shoes 13, the surfaces 24 having at least half of their width radially inwardly with respect to the bottom of the cable groove, or grooves, 23 and 23a (Fig. 3), so that there is no likelihood of breakage of the pulley wheel flanges regardless of the extent of compression loading.

The V-shaped cable groove feature is applicable, as illustrated in Fig. 3, to a pulley wheel 8a with a plurality of cable grooves 23a, in that case two being shown, it being a further feature of my invention to employ as many passes of cable 22a as there are grooves, for proportionately multiplied carrying load, each pass of the cable having, of course, the same wedging engagement in its V-groove 23a for non-slipping operation. The sling of Fig. 3 is otherwise the same as that of Figs. 1 and 2 and corresponding parts are numbered alike.

It is believed that the foregoing description conveys a good understanding of the objects and advantages of my invention. The appended claims have been drawn to cover all legitimate modifications and adaptations.

I claim:

1. A sling of the class described, comprising a load carrying frame consisting of spaced side members, a pulley wheel rotatably mounted between said side members and movable bodily downwardly relative thereto under load, spring means resisting downward movement of said wheel, a flexible load carrying cable of substantially circular cross-section extending only over the top half portion of said pulley and having means at its opposite ends for attachment to the load to be lifted, said wheel having a circumferentially extending cable receiving V-groove of inwardly tapering form, said wheel having an outwardly tapering V-form at its periphery, the included angle of the cable groove being slightly smaller than the included angle of the outwardly tapering peripheral portion of said wheel so that the wheel will slip and not the cable in the event some equalization is necessary after the initial setting of the wheel when the load is lifted, and arcuate brake shoes disposed on opposite sides of said wheel below the same and between the side members of said frame and having upwardly diverging surfaces between which the tapered portion of said wheel is adapted to have surface to surface wedging braking contact.

2. A sling of the class described, comprising a load carrying frame consisting of spaced side members, a pulley wheel rotatably mounted between said side members and movable bodily downwardly relative thereto under load, spring means resisting downward movement of said wheel, flexible load carrying cables of substantially circular cross-section extending only over the top half portion of said pulley and having means at their opposite ends for attachment to the load to be lifted, said wheel having parallel circumferentially extending cable receiving V-grooves of inwardly tapering form, said wheel having an outwardly tapering V-form at its periphery, the included angle of the cable grooves being slightly smaller than the included angle of the outwardly tapering peripheral portion of said wheel so that the wheel will slip and not the cables in the event some equalization is necessary after the initial setting of the wheel when the load is lifted, and arcuate brake shoes disposed on opposite sides of said wheel below the same and between the side members of said frame and having upwardly diverging surfaces between which the tapered portion of said wheel is adapted to have surface to surface wedging braking contact.

3. A sling of the class described, comprising a load carrying frame consisting of spaced side members, a pulley wheel rotatably mounted between said side members and movable bodily downwardly relative thereto under load, spring means resisting downward movement of said wheel, a flexible load carrying cable of substantially circular cross-section extending only over the top half portion of said pulley and having means at its opposite ends for attachment to the load to be lifted, said wheel having a circumferentially extending cable receiving V-groove of inwardly tapering form, said wheel having an outwardly tapering V-form at its periphery, the included angle of the cable groove being slightly smaller than the included angle of the outwardly tapering peripheral portion of said wheel so that the wheel will slip and not the cable in the event some equalization is necessary after the initial setting of the wheel when the load is lifted, and arcuate brake shoes disposed on opposite sides of said wheel below the same and between the side members of said frame and having upwardly diverging surfaces between which the tapered portion of said wheel is adapted to have surface to surface wedging braking contact, the outwardly tapered peripheral portion of said wheel being of increased width measured radially of the wheel and having at least half of the tapered portion disposed radially inwardly in relation to the bottom of said groove, and the upwardly diverging surfaces on said brake shoes being of increased width measured radially relative to said wheel to provide full width surface to surface engagement of the outwardly tapered peripheral portion of the wheel on said shoes.

4. A sling of the class described, comprising a load carrying frame consisting of spaced side members, a pulley wheel rotatably mounted between said side members and movable bodily downwardly relative thereto under load, spring means resisting downward movement of said wheel, flexible load carrying cables of substantially circular cross-section extending only over the top half portion of said pulley and having means at their opposite ends for attachment to the load to be lifted, said wheel having parallel circumferentiallly extending cable receiving V-grooves of inwardly tapering form, said wheel having an outwardly tapering V-form at its periphery, the included angle of the cable grooves being slightly smaller than the included angle of the outwardly tapering peripheral portion of said wheel so that the wheel will slip and not the cables in the event some equalization is necessary after the initial setting of the wheel when the load is lifted, and arcuate brake shoes disposed on opposite sides of said wheel below the same and between the side members of said frame and having upwardly diverging surfaces between which the tapered portion of said wheel is adapted to have surface to surface wedging braking contact, the outwardly tapered peripheral portion of said wheel being of increased width measured radially of the wheel and having at least half of the tapered portion disposed radially inwardly in relation to the bottoms of said grooves, and the upwardly diverging surfaces on said brake shoes being of increased width measured radially relative to said wheel to provide full width surface to surface engagement of the outwardly tapered peripheral portion of the wheel on said shoes.

LESLIE M. CALDWELL.

References Cited in the file of this patent

UNITED STATES PATENTS

| Number | Name | Date |
| --- | --- | --- |
| 1,324,952 | Bird et al. | Dec. 16, 1919 |
| 1,619,793 | Kerr | Mar. 1, 1927 |
| 2,293,230 | Waltz | Aug. 18, 1942 |
| 2,356,147 | Caldwell | Aug. 22, 1944 |
| 2,463,240 | Caldwell | Mar. 1, 1949 |
| 2,555,501 | Morgan | June 5, 1951 |